United States Patent
Burdeniuc et al.

(10) Patent No.: US 9,309,346 B2
(45) Date of Patent: Apr. 12, 2016

(54) POLYURETHANE FOAMS MADE WITH BLOWING CATALYST COMPOSITIONS CONTAINING PRIMARY HYDROXYL GROUPS AND HIGH ETHYLENEDIAMINE BACKBONES

(75) Inventors: Juan Jesus Burdeniuc, Colmar, PA (US); Douglas P. Freyberger, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/788,667

(22) Filed: May 27, 2010

(65) Prior Publication Data

US 2010/0240783 A1 Sep. 23, 2010

Related U.S. Application Data

(63) Continuation of application No. 11/108,958, filed on Apr. 19, 2005, now abandoned.

(51) Int. Cl.
*C08G 18/18* (2006.01)
*C08J 9/08* (2006.01)
*C08G 101/00* (2006.01)

(52) U.S. Cl.
CPC ............... *C08G 18/1825* (2013.01); *C08J 9/08* (2013.01); *C08G 2101/0008* (2013.01); *C08G 2101/0083* (2013.01); *C08J 2203/10* (2013.01); *C08J 2205/06* (2013.01)

(58) Field of Classification Search
CPC ............ C08G 18/1825; C08G 2101/0008; C08G 2101/0083; C08J 9/08; C08J 2203/10; C08J 2205/06
USPC ......... 521/117, 128, 129, 130, 164, 170, 172, 521/173, 174, 134, 137
See application file for complete search history.

(56) References Cited

U.S. PATENT DOCUMENTS

| | | | |
|---|---|---|---|
| 4,026,840 A | 5/1977 | Bechara et al. | |
| 4,246,360 A | 1/1981 | Brown et al. | |
| 4,338,408 A | 7/1982 | Zimmerman et al. | |
| 5,229,430 A | 7/1993 | Tamano et al. | |
| 5,508,314 A | 4/1996 | Listemann et al. | |
| 5,559,161 A | 9/1996 | Klotz et al. | |
| 5,633,293 A | 5/1997 | Carr et al. | |
| 6,187,957 B1 | 2/2001 | Meyer et al. | |
| 6,576,682 B2 | 6/2003 | Eyrisch et al. | |
| 6,590,007 B2 * | 7/2003 | Herrmann et al. | 521/137 |
| 6,710,096 B2 * | 3/2004 | Neff et al. | 521/174 |
| 6,723,819 B2 | 4/2004 | Masuda et al. | |
| 6,777,456 B2 | 8/2004 | Kiso et al. | |
| 2003/0083393 A1 * | 5/2003 | Kiso et al. | 521/131 |
| 2003/0144371 A1 * | 7/2003 | Kometani et al. | 521/99 |

FOREIGN PATENT DOCUMENTS

| | | |
|---|---|---|
| JP | 51-149292 | 12/1976 |
| JP | 56-143213 | 11/1981 |
| JP | 04-085317 | 3/1992 |
| JP | 06-016760 | 1/1994 |
| JP | 09-176266 | 8/1997 |

* cited by examiner

*Primary Examiner* — John Cooney
(74) *Attorney, Agent, or Firm* — Michael K. Boyer

(57) ABSTRACT

A method is provided for preparing polyurethane foams, which comprises contacting at least one organic isocyanate compound, at least one polyol, at least one blowing agent, and a tertiary amine catalyst composition. The catalyst composition has the general formula

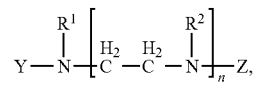

wherein $R_1$, $R_2$, and Y are, independently, an alkyl group having from one to three carbon atoms or —$CH_2CH_2OH$;

Z is —$CH_2CH_2OH$; and n is an integer from 3 to 7, inclusive.

Also provided is a method for catalyzing the reaction between at least one isocyanate compound and at least one active hydrogen-containing compound, such as a polyol and/or a blowing agent.

37 Claims, No Drawings

POLYURETHANE FOAMS MADE WITH BLOWING CATALYST COMPOSITIONS CONTAINING PRIMARY HYDROXYL GROUPS AND HIGH ETHYLENEDIAMINE BACKBONES

This application is a Continuation of U.S. patent application Ser. No. 11/108,958 filed 19 Apr. 2005, the entire disclosure of which is incorporated by reference herein in its entirety.

BACKGROUND OF THE INVENTION

The present invention relates to the use of hydroxyl-containing tertiary amines as catalysts for producing polyurethanes.

Polyurethane foams are widely known and used in the automotive, housing, and other industries. Such foams are produced by reaction of a polyisocyanate with a polyol in the presence of various additives. One such additive is a chlorofluorocarbon (CFC) blowing agent which vaporizes as a result of the reaction exotherm causing the polymerizing mass to form a foam. The discovery that CFCs deplete ozone in the stratosphere has resulted in mandates diminishing CFC use. Production of water blown foams, in which blowing is performed with $CO_2$ generated by the reaction of water with the polyisocyanate, has therefore become increasingly important. Tertiary amine catalysts are typically used to accelerate blowing, for example, the reaction of water with polyisocyanate to generate $CO_2$, and gelling, for example, the reaction of a polyol with isocyanate.

The ability of the tertiary amine catalyst to selectively promote either blowing or gelling is an important consideration in selecting a catalyst for the production of a particular polyurethane foam. If a catalyst promotes the blowing reaction to an excessive degree, much of the $CO_2$ will be evolved before sufficient reaction of isocyanate with polyol has occurred, and the $CO_2$ will bubble out of the formulation, resulting in a collapse of the polymerization mass and yielding foam of poor quality. In contrast, if a catalyst too strongly promotes the gelling reaction, a substantial portion of the $CO_2$ will be evolved after a significant degree of polymerization has occurred. Again, poor quality foams which are characterized by high density, broken or poorly defined cells, or other undesirable features will be produced.

Tertiary amine catalysts generally are malodorous and offensive and many have high volatility due to their low molecular weight. Release of tertiary amines during foam processing may present significant safety and toxicity problems, and release of residual amines from customer products is generally undesirable. On the other hand, low vapor pressure/high molecular weight amine catalysts are expected to require very high catalyst usage due to their low nitrogen/carbon ratio, making the manufacturing cost too high.

Tertiary amine catalysts containing hydroxyl functionality can chemically bind into the urethane matrix during the polymerization reaction, thus limiting their release from the finish product. For example, amine catalysts which contain primary and/or secondary hydroxyl functionality typically have limited volatility and low odor when compared to related structures without hydroxyl functionality.

The most effective hydroxyl-containing amine catalysts are the ones containing secondary alcohols in their structures because these catalysts exhibit a desirable balance between their promotion of the active hydrogen-isocyanate reaction (gelling and blowing) and their own reactivity with isocyanates. In addition, because the primary alcohols described in the prior art are highly reactive with isocyanates, they tend to lose their catalytic activity too early in the polymerization process. As a result, polyurethane foams produced using the primary alcohols described in the art have large voids and exhibit decreased demoldability. Furthermore, large amounts of the catalyst compositions containing primary hydroxyl functionality are required to effectively catalyze the blowing reaction. See for example, U.S. Pat. Nos. 4,026,840, 5,508, 314; 5,559,161; and 5,633,293. However, tertiary amine catalysts containing primary hydroxyl functionality are advantageous because they are more efficiently immobilized into the polyurethane matrix before and after polymerization. In addition, tertiary amines containing primary hydroxyl groups are characterized by lower odor and vapor pressure than their secondary hydroxyl counterparts. It is therefore desirable to produce a tertiary amine catalyst having primary hydroxyl functionality which more effectively promotes the blowing and gelling reactions while retaining their catalytic activity during the polymerization process.

BRIEF SUMMARY OF THE INVENTION

The present invention relates to a method for preparing polyurethane foams, which comprises contacting at least one organic isocyanate compound, at least one polyol, at least one blowing agent, and a tertiary amine catalyst composition. The catalyst composition has the general formula

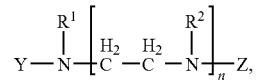

wherein
R$_1$, R$_2$, and Y are, independently, an alkyl group having from one to three carbon atoms or —CH$_2$CH$_2$OH;
Z is —CH$_2$CH$_2$OH; and
n is an integer from 3 to 7, inclusive.

The present invention also provides a method for catalyzing the reaction between at least one isocyanate compound and at least one active hydrogen-containing compound, such as a polyol and/or a blowing agent.

DETAILED DESCRIPTION OF THE INVENTION

The present invention provides a method for making polyurethane foams using tertiary amine catalyst compositions containing primary hydroxyl functionality. One aspect of the present invention encompasses producing polyurethane foams by contacting at least one isocyanate compound, at least one polyol compound, at least one blowing agent, and at least one tertiary amine catalyst composition. Another aspect of the present invention comprises a method for catalyzing the reaction between at least one isocyanate compound and at least one active hydrogen-containing compound, such as a polyol and/or a blowing agent.

The Tertiary Amine Catalyst Composition

Catalyst compositions in accordance with the present invention catalyze the reaction between an isocyanate and an active hydrogen-containing compound. The active hydrogen-containing compound can be, for example, an alcohol, a polyol, an amine, or water. Accordingly, the catalyst composition can promote, among other reactions, the gelling reaction of polyols with isocyanate to produce polyurethane, the blowing reaction of water with isocyanate to release carbon dioxide, or both reactions. In one aspect of the present invention, the catalyst compositions of the present invention effectively promote the blowing reaction of water with isocyanate.

In one aspect of the present invention, the tertiary amine catalyst composition has the general formula

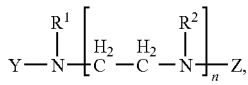

wherein
$R^1$, $R^2$, and Y are, independently, an alkyl group having from one to three carbon atoms or —$CH_2CH_2OH$;
Z is —$CH_2CH_2OH$; and
n is an integer from 3 to 7, inclusive.

In another aspect of the present invention, $R^1$ and $R^2$ are methyl groups, Y is a methyl group or —$CH_2CH_2OH$, and n is an integer from 3 to 7, inclusive.

Catalyst compositions in accordance with the present invention can be prepared by methods generally known in the art, for example, by reacting ethylene oxide with an amine such as triethylenetetramine (TETA), tetraethylenepentamine (TEPA), or pentaethylenehexamine (PEHA). The unreacted amine may be removed by distillation. The distilled product is reacted with formaldehyde and pressurized hydrogen at approximately 60-120° C. in the presence of a metal catalyst such as 5% palladium on carbon.

Examples of tertiary amine catalyst compositions of this invention include, but are not limited to
N-(2-hydroxyethyl)-N,N',N",N"',N'" pentamethyltriethylenetetramine;
N'-(2-hydroxyethyl)-N,N,N",N"',N'– pentamethyltriethylenetetramine;
N,N'-bis-(2-hydroxyethyl)-N,N",N"',N'" tetramethyltriethylenetetramine;
N,N"-bis-(2-hydroxyethyl)-N,N',N"',N'" tetramethyltriethylenetetramine;
N,N'"-bis-(2-hydroxyethyl)-N,N',N",N'" tetramethyltriethylenetetramine;
N-(2-hydroxyethyl)-N,N',N",N"',N"",N"" hexamethyltetraethylenepentamine;
N'-(2-hydroxyethyl)-N,N,N",N"',N"",N"" hexamethyltetraethylenepentamine;
N"-(2-hydroxyethyl)-N,N,N',N"',N"",N"" hexamethyltetraethylenepentamine;
N'"-(2-hydroxyethyl)-N,N,N',N",N"",N"" hexamethyltetraethylenepentamine;
or any combination thereof.

A catalytically effective amount of the catalyst composition may be used in the polyurethane formulation. In one aspect, suitable amounts of the catalyst composition may range from about 0.01 to about 10 parts catalyst composition per 100 parts polyol by weight (pphp) in the polyurethane formulation, or from about 0.05 to about 2 pphp. In another aspect, the ratio of the polyol to the catalyst composition ranges from about 10:1 to about 200:1. In yet another aspect, the ratio of the blowing agent to the catalyst composition ranges from about 1:1 to about 9:1.

As compared to structurally-related catalysts containing secondary hydroxyl functionality, catalyst compositions of the present invention more effectively promote the isocyanate gelling and blowing reactions, are better immobilized in the polyurethane matrix, and have lower vapor pressures. The hydroxyl functionality of the catalyst composition enables the catalyst compositions to react with, and be immobilized into, the polyurethane matrix during and after polymerization.

The prior art discusses tertiary amine catalysts containing primary hydroxyl functionality where n<3, but discloses that such catalysts are characterized by lower catalytic activity and higher amine emissions than structurally related catalysts containing secondary hydroxyl functionality. Though not wishing to be bound by theory, the improved properties of the catalysts of the present invention may be attributable to the ability of the higher ethylenediamine backbone (n≥3) amine catalyst to form a chemical adduct with water.

Polyols

Polyurethanes are produced from the polymerization reaction of organic isocyanate compounds with polyol hydroxyl groups. Polyols suitable for use in the present invention include, but are not limited to, polyalkylene ether polyols and polyester polyols. Polyalkylene ether polyols include poly(alkylene oxide) polymers such as poly(ethylene oxide) and poly(propylene oxide) polymers and copolymers with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

In one aspect of the present invention, a single high molecular weight polyether polyol may be used. Alternatively, a mixture of high molecular weight polyether polyols, for example, mixtures of di- and tri-functional materials and/or different molecular weight or different chemical composition materials may be used. Such di- and tri-functional materials include, but are not limited to, ethyleneglycol, polyethyleneglycol, propyleneglycol, polypropyleneglycol, glycerine, glycerine-based polyether triols, trimethylolpropane, trimethylolpropane-based polyether triols, 1,3-butane diol, 1,4-butane diol, 1,6-hexane diol, neopentyl glycol, or any combination thereof.

Useful polyester polyols include, but are not limited to, those produced by reacting a dicarboxylic acid with an excess of a diol, for example, adipic acid with ethylene glycol or butanediol, or reaction of a lactone with an excess of a diol such as caprolactone with propylene glycol.

In addition to polyalkylene ether polyols and polyester polyols, polymer polyols are also suitable for use in the present invention. Polymer polyols are used in polyurethane foams to increase the foam's resistance to deformation, for example, to improve the load-bearing properties of the foam. Examples of polymer polyols include, but are not limited to, graft polyols or polyurea modified polyols (Polyharnstoff Dispersion polyols). Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol. Depending upon the load-bearing requirements, polymer polyols may comprise from about 20 to about 80 percent by weight of the total polyol content.

Blowing Agents

Polyurethane foams are typically produced from the reaction of isocyanates with a polyol in the presence of a blowing agent to produce voids in the polyurethane matrix during polymerization. Suitable blowing agents include, for example, inert compounds with low boiling points which are vaporized during the exothermic polymerization reaction. Such blowing agents are generally inert compounds that do not decompose or react during the polymerization reaction. The reaction exotherm is generally sufficient to vaporize the blowing agent, which then becomes entrapped in the polyurethane matrix, resulting in the formation of voids or cells. Optionally, additional heat can be added during the reaction to promote vaporization of the blowing agent. Examples of such blowing agents include, but are not limited to, chlorofluorocarbons, hydrogenated fluorocarbons, hydrogenated chlorofluorocarbons, and low-boiling hydrocarbons such as cyclopentane, isopentane, or n-pentane, or any combination thereof.

A preferred blowing agent is water. Catalyst compositions of the present invention are useful for catalyzing the reaction of isocyanates with water to produce carbon dioxide. As the carbon dioxide gas is produced, it becomes trapped in the polyurethane matrix, forming voids or cells.

Optional Additives

In one aspect, this invention encompasses a method for producing a polyurethane foam comprising reacting at least one isocyanate compound, at least one polyol compound, at least one blowing agent, at least one tertiary amine catalyst composition, and optionally, at least one auxiliary component. In another aspect, the present invention provides a method for catalyzing the reaction between at least one isocyanate compound, at least one active hydrogen-containing compound, and optionally, at least one auxiliary component.

Examples of auxiliary components include, but are not limited to, cell stabilizers, crosslinking agents, chain extenders, pigments, fillers, flame retardants, auxiliary gelling catalysts, auxiliary blowing catalysts, transition metal catalysts, or any combination thereof.

Cell stabilizers may include, for example, silicon surfactants or anionic surfactants. Examples of suitable silicon surfactants include, but are not limited to, polyalkylsiloxane, polyoxyalkylene polyol-modified dimethylpolysiloxane, alkylene glycol-modified dimethylpolysiloxane, or any combination thereof. Suitable anionic surfactants include, but are not limited to, salts of fatty acids, salts of sulfuric acid esters, salts of phosphoric acid esters, sulfonates, or any combination thereof.

Suitable crosslinking agents include, but are not limited to, low-molecular compounds having at least two groups selected from a hydroxyl group, a primary amino group, a secondary amino group, or other active hydrogen-containing groups which are reactive with an isocyanate group. Crosslinking agents include, for example, polyhydric alcohols, polyamines, or any combination thereof. Non-limiting examples of suitable polyhydric alcohols include ethylene glycol, diethylene glycol, propylene glycol, dipropylene glycol, 1,4-butanediol, 1,6-hexanediol, neopentyl glycol, glycerol, trimethylolpropane, or any combination thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, or any combination thereof.

Examples of chain extenders include, but are not limited to, compounds having hydroxyl or amino functional group, such as glycols, amines, diols, and water. Further non-limiting examples of chain extenders include ethylene glycol, propylene glycol, 1,4-butanediol, 1,3-butanediol, 1,5-pentanediol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof.

Pigments may be used to color code the polyurethane foams during manufacture, to identify product grade, or to conceal yellowing. Pigments may include any suitable organic or inorganic pigments. For example, organic pigments or colorants include, but are not limited to, azo/diazo dyes, phthalocyanines, dioxazines, or carbon black. Examples of inorganic pigments include, but are not limited to, titanium dioxide, iron oxides, or chromium oxide. Fillers may be used to increase the density and load bearing properties of polyurethane foams. Suitable fillers include, but are not limited to, barium sulfate or calcium carbonate. Flame retardants can be used to reduce the flammability of polyurethane foams. For example, suitable flame retardants include, but are not limited to, chlorinated phosphate esters, chlorinated paraffins, or melamine powders.

Auxiliary gelling catalysts may include, but are not limited to, diazabicyclooctane (triethylenediamine), supplied commercially as DABCO 33-LV® catalyst by Air Products and Chemicals, Inc.; quinuclidine and substituted quinuclidines; substituted pyrrolidines or pyrrolizidines; or N,N-dimethylaminoalkyl ureas and similar blends, supplied commercially, for example, as DABCO® NE1070, DABCO® NE1060, DABCO® NE200, DABCO® NE400, DABCO® NE500, and DABCO® NE600.

Non-limiting examples of suitable auxiliary blowing catalysts include, bisdimethylaminoethyl ether, commercially supplied as DABCO® BL-11 catalyst by Air Products and Chemicals, Inc.; pentamethyl-diethylenetriamine and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. Catalysts compositions in accordance with the present invention may also be used in combination with transition metal catalysts, such as organotin catalysts.

Polyurethane Foams

Polyurethane foams produced in accordance with the present invention are prepared by reacting any suitable organic isocyanate compounds with any suitable polyol compounds in the presence of one or more suitable blowing agents, as described in the art. Organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are mixtures of diisocyanates known commercially as "crude MDI", marketed as PAPI by Dow Chemical Company, which contains about 60% of 4,4'-diphenylmethane diisocyanate along with other isomeric and analogous higher polyisocyanates. Also suitable are "prepolymers" of these isocyanate compounds, comprising a partially prereacted mixture of a polyisocyanate and a polyether or polyester polyol.

Polyurethane foams produced using prior art tertiary amine catalysts containing primary hydroxyl functionality have poor physical properties as compared to foams produced with structurally related catalysts containing secondary hydroxyl functionality. In contrast, polyurethane foams produced using catalyst compositions of the present invention are comparable or superior to foams produced using structurally related catalysts containing secondary hydroxyl functionality. For example, polyurethane foams produced with a catalyst composition in accordance with the present invention have reduced odor and no amine emissions as compared to foams produced by structurally-related catalysts containing secondary hydroxyl functionality.

A polyurethane foam produced in accordance with one aspect of the present invention, has an isocyanate index between about 70 and about 115 and comprises the following components by weight:

TABLE 1

Polyurethane Components

| Component | Percent by Weight |
| --- | --- |
| Polyol | 20-100 |
| Polymer polyol | 0-80 |
| Silicon surfactant | 1-2.5 |
| Blowing agent | 2-4.5 |
| Crosslinker | 0.5-2 |
| Catalyst composition | 0.25-2 |

The term "isocyanate index" (also commonly referred to as NCO index), is defined herein as the number of equivalents of isocyanate, divided by the total number of equivalents of active hydrogen, multiplied by 100. The NCO index is represented by the formula NCO index=[NCO/(OH+NH)]*100.

Although the present invention has been described as useful for preparing flexible polyurethane foams, the invention may also be employed to prepare semi-flexible and rigid polyurethane foams. Rigid polyurethane foams can be distinguished from flexible polyurethane foams by the presence of higher isocyanurate levels in the rigid foam. Flexible foams typically use polymer polyol as part of the overall polyol content in the foam composition, along with conventional triols of about 4000-5000 weight average molecular weight ($M_w$) and hydroxyl number (OH#) of about 28-35. In contrast, rigid polyurethane foam compositions use about 500-1000 $M_w$ polyol with about 3-8 hydroxyl functionalities and OH# of about 160-700. Rigid foams can also be distinguished from the flexible foams by the isocyanate (NCO) index of the foam composition. Rigid foam compositions typically use a 100-300 NCO index whereas flexible foam compositions typically require a 70-115 NCO index.

For making lamination (insulation board) and appliance foams, the NCO index is typically from about 100 to about 300. For making open cell foam, the NCO index is typically from about 100 to about 120, and the foam is usually all water blown. Semiflexible molded foams have been utilized for many applications in the automotive area. The major applications are instrument panels and interior trims. The two main components are the base polyol and copolymer polyol (CPP). The base polyol is utilized at levels between about 70-100 pphp. The molecular weight of base polyols ranges from about 4500 to about 6000 for triols and from about 2000 to about 4000 for diols. Ethylene-oxide-capped polyether polyols have replaced most polyester polyols as the base polyol. The primary hydroxyl content is usually greater than about 75 wt % and the capping range is typically about 10-20 wt %. The other major component is CPP, which is used at levels up to about 20 wt %. The base polyol and CPP are blended with low molecular weight cross-linkers to build hardness and promote faster demolding. The level of cross-linker varies depending on the hardness requirement of the finished part. Water levels are chosen to give free rise densities from about 3 to about 6 pounds. Cell openers are also utilized in semi-flexible foams to reduce the internal foam pressure during the cure cycle and thus reduce pressure-relief voids and "parting lines". Adhesion promoters can be added, depending upon the quality of the vinyl skin, to improve the adhesion between the polyurethane foam and the vinyl skin. The use of the catalyst composition of the present invention can reduce the discoloration of the vinyl skin typically observed with conventional amine catalysts because the N—H group of the amide functionality can react with the isocyanate to form a covalent bond with the polyurethane polymer.

As described in the examples below, the foams made with the reactive catalyst composition are of the same or superior quality as the foams made with the industry standard. Also, catalyst composition in accordance with the present invention provide the following advantages: low amine emissions in the finished polyurethane product; low tertiary amine catalyst vapor pressure, low odor of the finished polyurethane product, effective immobilization of the tertiary amine catalyst during and after polymerization, lower amine concentration in the finished polyurethane product, and optimum physical polyurethane foam properties.

Example 1

Synthesis of N-[2-hydroxyethyl]-N,N',N'',N''',N''' pentamethyltriethylenetetramine A sample of about 519 grams of commercially available triethylenetetramine (about 67 wt %) was charged into a one-liter stainless steel reactor equipped with a cooling and heating jacket, a stirrer, a syringe pump and FTIR. The amine was heated to about 50° C. and pressurized with approximately 50 psig nitrogen. Ethylene oxide (about 170 g) was slowly added to the mixture and the product was allowed to stir for approximately one hour after addition, until the reaction was finished. The product was collected (about 639 g) and distilled under vacuum (20 mm Hg) to remove any unreacted amine. The crude ethoxylated product was dissolved in isopropanol and placed in the reactor together with 5% palladium on a carbon catalyst. The reactor was pressurized with hydrogen and heated up to about 90° C. Formalin (37% formaldehyde in water) was slowly added while the hydrogen pressure was monitored. At the end of the addition the reaction was kept at about 90° C. for approximately one hour. The product was filtered and isopropanol and water were removed from the product by distillation to yield a mixture containing NN-[2-hydroxyethyl]-N,N',N'',N''',N''' pentamethyltriethylenetetramine.

Example 2

Synthesis of N-[2-hydroxypropyl]-N,N',N'',N''',N''' pentamethyltriethylenetetramine A sample of about 500 grams of commercially available triethylenetetramine (about 67 wt %) was charged into a one-liter stainless steel reactor equipped with a cooling and heating jacket, a stirrer, a syringe pump and FTIR. The amine was heated to about 80° C. and propylene oxide (about 187 g) was slowly added to the mixture. The product was allowed to stir for approximately one hour after addition, until the reaction was completed. The product was collected and distilled under vacuum (20 mm Hg) to remove any unreacted amine. The product mixture was dissolved in methanol and placed in the reactor together with 5% palladium on carbon catalyst. The reactor was pressurize with hydrogen and heated up to about 90° C. Formalin (37% formaldehyde in water) was slowly added while the hydrogen pressure was monitored. At the end of the addition the reaction was kept at about 90° C.

for approximately one hour. The product was filtered and methanol and water were removed from the product by distillation to yield a mixture containing N-[2-hydroxypropyl]-N,N',N'',N''',N'''' pentamethyltriethylenetetramine.

Example 3

Rate of Rise of Polyurethane Foams

Two foams were prepared. Foam A was prepared using the catalyst of Example 1 (a mixture comprising, in major part, N-[2-hydroxyethyl]-N,N',N'',N''',N'''' pentamethyltriethylenetetramine) and Foam B was prepared using the catalyst of Example 2 (a mixture comprising, in major part, N-[2-hydroxypropyl]-N,N',N'',N''',N'''' pentamethyltriethylenetetramine).

For each foam, the catalyst was added to about 192 g of the premix (described in Table 2) in a 32 oz (951 mL) paper cup. The formulation was mixed for about 10 seconds at about 6,000 RPM using an overhead stirrer fitted with a 2 inch (5.1 cm) diameter stirring paddle.

TABLE 2

Premix Components (Example 3)

| Component | Percent by Weight |
| --- | --- |
| Polyol 1 | 50 |
| Polyol 2 | 50 |
| Water | 2.34 |
| Silicon surfactant | 0.75 |
| DABCO 33-LV ® | 0.25 |
| DABCO ® BL-11 | 0.10 |
| Crosslinker | 1.76 |

Toluene diisocyanate was added in an amount sufficient to produce a foam with an NCO index of approximately 100. The formulation was mixed well for about 6 seconds at about 6,000 RPM using the same stirrer. The 32 oz cup was dropped through a hole in the bottom of a 128 oz (3804 mL) paper cup on a stand. The hole was sized to catch the lip of the 32 oz cup. The total combined volume of the paper cups was about 160 oz (4755 ml). Foams approximated this volume at the end of the foaming process. Maximum foam height was recorded. A comparison of the properties of Foam A and Foam B is presented below in Tables 3 and 4.

TABLE 3

Foam Comparison (Example 3)

| PARAMETER | FOAM A | FOAM B |
| --- | --- | --- |
| Amount of catalyst (pphp) | 0.20 | 0.20 |
| Amount of DABCO ® NE1060[1] (pphp) | 0.70 | 0.70 |
| Cream (sec) | 8.10 | 8.20 |
| Cup 1 (sec) | 14.90 | 14.30 |
| String gel (sec) | 66.40 | 66.50 |
| Full rise (mm) | 124 | 127 |
| Full height (mm) | 274.7 | 272.3 |

[1] DABCO ® NE1060 is a commercially available catalyst supplied by Air Products & Chemicals, Inc.

TABLE 4

Foam Comparison (Example 3)

| PARAMETER | FOAM A | FOAM B |
| --- | --- | --- |
| Amount of catalyst (pphp) | 0.20 | 0.20 |
| Amount of catalyst (moles × 10³) | 0.76 | 0.73 |
| Catalyst molecular weight ($M_w$) | 260 | 274 |
| Mixing time (sec) | 4 | 4 |
| Test time (sec) | 180 | 180 |
| Rise height (mm) | 269.3 | 266.9 |
| Rise time (sec) | 85.10 | 88.30 |
| Maximum height (mm) | 274.8 | 272.4 |
| Final height (mm) | 271.3 | 269.4 |
| Shrinkage (%) | 1.30 | 1.10 |

As shown in Tables 3 and 4, N-[2-hydroxyethyl]-N,N',N'',N''',N'''' pentamethyltriethylenetetramine (a tertiary amine containing primary hydroxyl functionality) and N-[2-hydroxypropyl]-N,N',N'',N''',N'''' pentamethyltriethylenetetramine (a tertiary amine containing secondary hydroxyl functionality) produce foams with comparable properties when the catalysts are used in comparable amounts. Furthermore, foam appearance and percent shrinkage were essentially identical, showing that catalyst compositions of the present invention do not exhibit either diminished reactivity as compared to a structurally-related catalyst containing secondary hydroxyl functionality or dimished foam quality as compared to a foam produced by a structurally-related catalyst containing secondary hydroxyl functionality.

Example 4

Rate of Rise of Polyurethane Foams

Foam A' and Foam B' were prepared as in Example 4, but with higher levels of catalyst composition. As in Example 3, the foams produced using N-[2-hydroxyethyl]-N,N',N'',N''',N'''' pentamethyltriethylenetetramine (a tertiary amine containing primary hydroxyl functionality) and N-[2-hydroxypropyl]-N,N',N'',N''',N'''' pentamethyltriethylenetetramine (a tertiary amine containing secondary hydroxyl functionality) exhibited similar properties. See Tables 5 and 6.

TABLE 5

Foam Comparison (Example 4)

| PARAMETER | FOAM A' | FOAM B' |
| --- | --- | --- |
| Amount of catalyst (pphp) | 0.25 | 0.25 |
| Amount of DABCO ® NE1060 (pphp) | 0.70 | 0.70 |
| Cream (sec) | 8.30 | 8.20 |
| Cup 1 (sec) | 13.90 | 14.30 |
| String gel (sec) | 65.70 | 66.30 |
| Full rise (mm) | 111.0 | 116.0 |
| Full height (mm) | 279.1 | 276.0 |

TABLE 6

Foam Comparison (Example 4)

| PARAMETER | FOAM A' | FOAM B' |
| --- | --- | --- |
| Amount of catalyst (pphp) | 0.25 | 0.25 |
| Amount of catalyst (moles × 10³) | 0.95 | 0.91 |
| Catalyst molecular weight ($M_w$) | 260 | 274 |
| Mixing time (sec) | 4 | 4 |
| Test time (sec) | 180 | 180 |
| Rise height (mm) | 273.6 | 270.6 |
| Rise time (sec) | 82.4 | 86.0 |
| Maximum height (mm) | 279.2 | 276.1 |

TABLE 6-continued

Foam Comparison (Example 4)

| PARAMETER | FOAM A' | FOAM B' |
|---|---|---|
| Final height (mm) | 275.6 | 273.4 |
| Shrinkage (%) | 1.30 | 1.00 |

The invention claimed is:

1. A method to produce a foamed polyurethane comprising:
   contacting
   (a) at least one organic isocyanate compound having an NCO index of about 100 to about 120;
   (b) at least one polymer polyol having a hydroxyl number of about 28-35;
   (c) a blowing agent consisting essentially of water, and (d) a catalyst comprising a blowing catalyst comprising N-(2-hydroxyethyl)-N, N', N", N'", N'" pentamethyltriethylenetetramine and at least one gelling catalyst; and,
   under conditions sufficient for the catalyst to promote a gelling reaction with the isocyanate and a reaction of water with the isocyanate to release carbon dioxide, and wherein the foamed polyurethane comprises a flexible open celled foam.

2. A method according to claim 1, wherein the organic isocyanate compound comprises at least one member selected from the group consisting of hexamethylene diisocyanate, phenylene diisocyanate, toluene diisocyanate, 4,4'-diphenylmethane diisocyanate, or any combination thereof.

3. A method according to claim 2, wherein the organic isocyanate compound comprises at least one member selected from the group consisting of 2,4-toluene diisocyanate, 2,6-toluene diisocyanate, or any combination thereof.

4. A method according to claim 1, further comprising at least one member selected from the group consisting of at least one polyalkylene ether polyol, at least one polyester polyol, at least one polymer polyol, or any combination thereof.

5. A method according to claim 4, wherein the polyalkylene ether polyol comprises a poly(ethylene oxide) or poly(propylene oxide) polymer or copolymer with a terminal hydroxyl group.

6. A method according to claim 5, wherein the polyalkylene ether polyol comprises at least one member selected from the group consisting of ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, or any combination thereof.

7. A method according to claim 1, wherein the ratio of the polyol to the catalyst composition ranges from about 10:1 to about 200:1.

8. A method according to claim 1, wherein the ratio of water to the catalyst composition ranges from about 1:1 to about 9:1.

9. A method according to claim 1, further comprising contacting (a), (b), (c), and (d) with at least one cell stabilizer, at least one crosslinking agent, at least one chain extender, at least one pigment, at least one filler, at least one flame retardant, at least one auxiliary gelling catalyst, at least one auxiliary blowing catalyst, at least one transition metal catalyst, or any combination thereof.

10. A method according to claim 9, wherein the cell stabilizer comprises at least one member selected from the group consisting of a silicon surfactant, an anionic surfactant, or any combination thereof.

11. A method according to claim 10, wherein the silicon surfactant comprises at least one member selected from the group consisting of polyalkylsiloxane, polyoxyalkylene polyol-modified dimethylpolysiloxane, alkylene glycol-modified dimethylpolysiloxane, or any combination thereof.

12. A method according to claim 10, wherein the anionic surfactant comprises at least one member selected from the group consisting of a salt of a fatty acid, a salt of a sulfuric acid ester, a salt of a phosphoric acid ester, a sulfonate, or any combination thereof.

13. A method according to claim 9, wherein the crosslinking agent comprises at least one member selected from the group consisting of a polyhydric alcohol, a polyamine, or any combination thereof.

14. A method according to claim 13, wherein the polyhydric alcohol comprises at least one member selected from the group consisting of ethylene glycol, diethylene glycol, propylene glycol, dipropylene glycol, 1,4-butanediol, 1,6-hexanediol, neopentyl glycol, glycerol, trimethylolpropane, or any combination thereof.

15. A method according to claim 13, wherein the polyamine comprises at least one member selected from the group consisting of diethyltoluenediamine, chlorodiaminobenzene, diethanolamine, diisopropanolamine, triethanolamine, tripropanolamine, 1,6-hexanediamine, or any combination thereof.

16. A method according to claim 9, wherein the chain extender comprises at least one member selected from the group consisting of a glycol, an amine, a diol, or any combination thereof.

17. A method according to claim 16, wherein the chain extender comprises at least one member selected from the group consisting of ethylene glycol, propylene glycol, 1,4-butanediol, 1,3-butanediol, 1,5-pentanediol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclo-hexanol, 1,2-diaminoethane, 2,4-toluenediamine, or any combination thereof.

18. A method according to claim 1, wherein the gelling catalyst comprises at least one member selected from the group consisting of diazabicyclooctane (triethylenediamine), quinuclidine, a substituted quinuclidine, a substituted pyrrolidine, a substituted pyrrolizidine, an N,N-dimethylaminoalkyl urea, or any combination thereof.

19. A method according to claim 9, wherein the auxiliary blowing catalyst comprises at least one member selected from the group consisting of bisdimethylaminoethyl ether, pentamethyl-diethylenetriamine, a higher permethylated polyamine, 2-[N-(dimethylaminoethoxyethyl)-N-methylamino]ethanol, an alkoxylated polyamine, an imidazole-boron composition, an amino propyl-bis(amino-ethyl)ether composition, or any combination thereof.

20. The method of claim 1 wherein the blowing catalyst comprises the reaction product of triethylenetetramine and ethylene oxide.

21. A method to produce a foamed polyurethane comprising:
   contacting
   (a) at least one organic isocyanate compound;
   (b) at least one base polyol and at least one polymer polyol;
   (c) a blowing agent consisting essentially of water, and (d) a catalyst comprising at least one blowing catalyst, at least one gelling catalyst, the reaction product of triethylenetetramine and propylene oxide, and N-(2-hydroxyethyl)-N, N', N'',N''', N'''' pentamethyltriethylenetetramine and wherein the foamed polyurethane comprises a flexible open celled polyurethane foam.

22. The method of claim 21 wherein the least one organic isocyanate compound reacts with water to release a blowing agent comprising carbon dioxide and wherein the catalyst has a hydroxyl functionality that reacts with and immobilizes the catalyst into the polyurethane thereby producing a foamed polyurethane without amine emissions.

23. A method to produce a foamed polyurethane comprising:
   contacting
   (a) at least one organic isocyanate compound;
   (b) at least one polymer polyol;
   (c) at least one blowing agent consisting essentially of water, and
   (d) a catalyst comprising N-(2-hydroxyethyl)-N, N',N'', N''',N'''' pentamethyltriethylenetetramine and at least one N,N-dimethylaminoalkyl urea; under conditions sufficient to produce a flexible open celled polyurethane foam.

24. The method of claim 23 further comprising at least one silicon surfactant.

25. The method of claim 24 further comprising at least one crosslinker.

26. The method of claim 25 further comprising at least one blowing catalyst.

27. A foamed polyurethane production method comprising contacting:
   (a) at least one organic isocyanate compound;
      with a pre-mix comprising:
   (b) at least one polymer polyol having a hydroxyl number of about 28-35;
   (c) at least one blowing agent consisting essentially of water,
   (d) at least one gelling catalyst,
   (e) at least one blowing catalyst, and
   (f) at least one catalyst comprising a compound having a formula

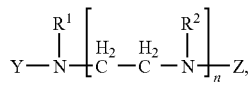

wherein $R^1$ and $R^2$ are methyl groups, Y is a methyl group or —$CH_2CH_2OH$;
Z is —$CH_2CH_2OH$; and
n is an integer from 3 to 7, inclusive; and wherein the foamed polyurethane comprises an open celled flexible foam.

28. The method of claim 27 wherein the gelling catalyst comprises triethylenediamine.

29. The method of claim 27 wherein the blowing catalyst comprises bisdimethylaminoethyl ether.

30. The method of claim 28 wherein the blowing catalyst comprises bisdimethylaminoethyl ether.

31. The method of claim 1 wherein the gelling catalyst comprises N,N-dimethylaminoalkyl urea.

32. The method of claim 23 wherein the polyol has about 3-8 hydroxyl functionalities and an OH number of about 160 to 700, and the isocyanate has an NCO index of 70-115.

33. The method of claim 21 wherein the base polyol is utilized in an amount of about 70 to about 100 pphp.

34. The method of claim 27 wherein the catalyst comprises N-[2-hydroxypropyl]-N,N',N'',N''', N''''pentamethyltriethylenetetramine.

35. A foamed polyurethane production method comprising contacting:
   (a) at least one organic isocyanate compound;
      with a pre-mix comprising:
   (b) at least one polymer polyol;
   (c) at least one blowing agent consisting essentially of water, and
   (d) at least one catalyst comprising a compound having a formula

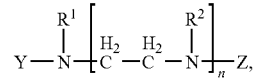

wherein $R^1$ and $R^2$ are methyl groups, Y is a methyl group or —$CH_2CH_2OH$;
Z is —$CH_2CH_2OH$; and
n is an integer from 3 to 7, inclusive; and wherein the foamed polyurethane comprises an open celled flexible foam.

36. The method of claim 35 wherein a hydroxyl functionality of the catalyst reacts with and immobilizes the catalyst into the polyurethane.

37. The method of claim 36 wherein the foamed polyurethane has no amine emissions.

* * * * *